Patented Mar. 3, 1942

UNITED STATES PATENT OFFICE 2,275,378

POLYALKYLENE ETHER DISULPHONYL HALIDES AND A PROCESS OF MAKING THEM

Treat Baldwin Johnson, Bethany, Conn., assignor to Rohm & Haas Company, Philadelphia, Pa., a corporation of Delaware No Drawing. Application September 10, 1937, Serial No. 163,184

8 Claims. (Cl. 260—543)

This invention relates to new sulphonyl halides and sulphonyl amides; it relates more particularly to the sulphonyl halides and sulphonyl amides of polyalkylene ether compounds, and includes not only these new compounds, but also their method of preparation.

This application is in part a continuation of my prior application Serial No. 136,129, Patent No. 2,147,346, filed April 10, 1937.

The new products of the present invention may be represented by the graphic formula YRY in which Y represents a sulphonyl halide group and R a polyalkylene ether group. Of particular importance are the polyalkylene ether compounds of the general formula

$$Y(C_nH_{2n}O)_xC_nH_{2n}Y$$

in which Y is as above, $n$ may be two or three, and $x$ may be one or two. Examples of such new products are B, B'-disulphonylchloride diethyl ether, B-sulphonylchloride ethoxy-B'-sulphonylchloride diethyl ether, B,B'-disulphonylchloride diisopropyl ether, B-sulphonylchloride propoxy-B'-sulphonylchloride dipropyl ether and the corresponding amides and other halides.

These new products are advantageously prepared by exposing an aqueous solution or suspension of the corresponding pseudothiourea or pseudothiourea salt to the action of a halogen, as shown in the following equation:

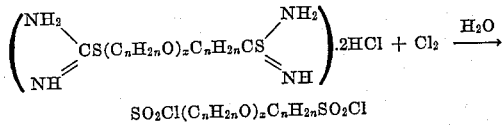

$$SO_2Cl(C_nH_{2n}O)_xC_nH_{2n}SO_2Cl$$

in which $n$ may be two or three and $x$ may be one or two, as above, and in which the hydrochloride is shown by way of example, as the pseudothiourea salts of nearly any acid may be used. Of course, other halogens than chlorine may be used for the reaction, with the production of corresponding sulphonyl halides. Care must be taken, however, if it is desired to produce pure sulphonyl halides, that the pseudothiourea salts, if they be hydrohalides, be salts of the acid corresponding to the desired sulphonyl halide, to prevent reaction of the halogen with the hydrohalogen and the production of mixed sulphonyl halides. By the use of salts of the pseudothiourea compounds other than the hydrohalides, such as the acetates, sulphates, or other salts, the pure sulphonyl halides are readily produced with any of the halogens. This advantageous process of preparing the compounds is included in the present invention, and is a specific application of the processes broadly described and claimed in my prior application Serial No. 136,129, Patent No. 2,147,346 and my prior application Serial No. 72,983, Patent No. 2,146,744, filed April 6, 1936.

The di-pseudothiourea derivatives which are used as intermediate products for the production of the disulphonyl halides and amides are readily produced by reacting thiourea and the corresponding dichloro-polyalkylene ethers, for example, in one of the lower alcohols, such as ethyl alcohol or butyl alcohol, followed by removal of the alcohol by distillation. The pseudothiourea derivatives so produced are then dissolved or suspended in water into contact with which chlorine is passed. The chlorine reacts with the pseudothiourea compound, producing directly the corresponding di-sulphonylchloride, which is precipitated and usually is easily purified. During this operation, the reaction mixture should be maintained relatively cool. For the production of the other disulphonylhalides, the pseudothiourea hydrochloride produced as described should be converted to salts of other acids than hydrochloric acid, for example, acetic acid, sulphuric acid, etc., or to the hydrohalide of the halogen of the desired product.

From the sulphonyl halides, such as the chlorides, the corresponding amides are readily prepared by introducing the chloride slowly into an excess of concentrated ammonium hydroxide with stirring and cooling. The clear solution so obtained is evaporated to dryness and the amide obtained may be purified by extraction with ethyl alcohol followed by crystallization.

The invention will be further illustrated by the following specific examples, although it is not limited thereto.

EXAMPLE 1. *Preparation of B-B'-disulphonylchloride diethyl ether.*—76 parts of thiourea, 80 parts of B, B'-dichlorodiethyl ether and about 80 parts of ethyl alcohol are heated under a reflux condenser on a steam bath until all of the thiourea has been reacted, as shown by the fact that no precipitate is given with ammoniacal silver nitrate. 1000 parts of water and 500 parts of cracked ice are then added and chlorine is passed through the resulting solution while maintaining the temperature below 10°. The B,B'-disulphonchloride diethyl ether is obtained in about a 90% yield in the form of a heavy yellow oil which could not be distilled without decomposition.

The reactions occurring in the preparation of this compound may be summarized by the following equation:

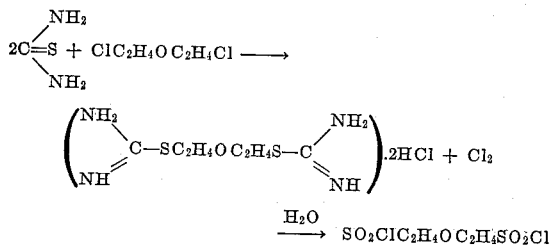

EXAMPLE 2. *Preparation of B,B'-disulphonamide diethyl ether.*—The disulphonyl chloride from Example 1 is added drop by drop to an excess of concentrated ammonium hydroxide, and the solution obtained is evaporated to dryness. The disulphonamide is extracted with acetone and recrystallized from a mixture of acetone and ether to purify it. The product so obtained has a melting point of 125–126°. The reaction occurring in the preparation of this compound may be summarized by the following equation:

$SO_2ClC_2H_4OC_2H_4SO_2Cl + 2NH_3 \rightarrow$
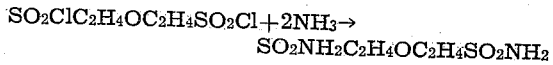

EXAMPLE 3. *Preparation of B-sulphonchloride ethoxy-B'-sulphonchloride diethyl ether.*—76 parts of thiourea and 100 parts of B-chloroethoxy-B'-chlorodiethyl ether are refluxed in about 200 parts of n-butyl alcohol for two hours. At the end of this time, the thiourea has all reacted as is shown by the fact that it gives no black precipitate with ammoniacal silver nitrate. The butyl alcohol is then removed by distillation at diminishing pressure, leaving a slightly yellow water-soluble resin. This resin is dissolved in about 1500 parts of water and allowed to trickle down through a tower packed with glass rings, the temperature being maintained at about 30° C., while a stream of chlorine enters at the bottom of the tower and rises countercurrent to the descending solution. B-sulphonchloride ethoxy-B'-sulphonchloride-diethyl ether is obtained as a heavy, pale yellow oil in a yield of about 85%. The reactions occurring in the preparation of this compound may be summarized by the following equation:

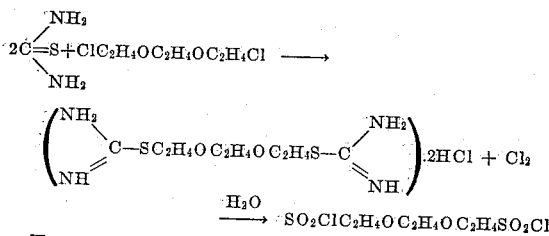

EXAMPLE 4. *Preparation of B-sulphonamide ethoxy-B'-sulphonamide diethyl ether.*—The disulphonchloride obtained in Example 3 is allowed to drip into an excess of concentrated ammonium hydroxide while stirring and cooling with ice. A clear solution is obtained which is evaporated to dryness, the residue being extracted with hot ethyl alcohol. From this alcohol the disulphonamide crystallizes out in colorless crystals melting at 97–98° C. The reaction occurring in the preparation of this compound may be summarized by the following equation:

$SO_2ClC_2H_4OC_2H_4OC_2H_4SO_2Cl + 2NH_3 \rightarrow$
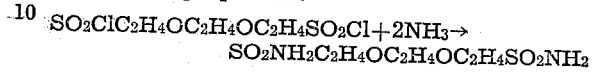

Other disulphonhalides and disulphonamides of polyalkylene ethers, such as the propyl analogues of those described in the foregoing examples, are readily prepared in a similar way. Thus from B,B'-dichlordiisopropyl ether and B, chlorpropoxy-B'-chlordipropyl ether the corresponding B,B'-disulphonchloride diisopropyl ether and B-sulphonchlorpropoxy-B'-sulphonchloride dipropyl ether, and other corresponding halides and sulphonamides, are readily prepared.

The polyalkylene ether disulphonyl amides and the process of producing them are claimed in my co-pending application Serial No. 398,578, which is a division of the present application. The claims in the present application are directed to the polyalkylene ether disulphonyl halides and the process of producing them.

I claim:
1. The process which comprises reacting thiourea with a chlorinated polyalkylene ether, and subjecting the resulting pseudothiourea compound to the action of a halogen in the presence of water.
2. The process which comprises reacting thiourea with a dichloro polyalkylene ether, and subjecting the resulting pseudothiourea compound to the action of a halogen in the presence of water.
3. The process which comprises reacting thiourea with a B,B'-dichloro polyalkylene ether, and subjecting the resulting pseudothiourea compound to the action of a halogen in the presence of water.
4. The process which comprises reacting a salt of a dipseudothiourea derivative of a polyalkylene ether with a halogen in the presence of water.
5. Compounds of the formula

$$Y(C_nH_{2n}-O)_x-C_nH_{2n}Y$$

in which Y is a sulphonyl halide radical, $n$ is an integer from 2 to 3, and $x$ is an integer from 1 to 2.

6. As new compounds B,B'-disulphonyl halide diethyl ethers.
7. As new compounds B-sulphonyl halide ethoxy-B'-sulphonyl halide diethyl ethers.
8. A polyalkylene ether disulphonyl halide.

TREAT BALDWIN JOHNSON.